Dec. 8, 1964     J. R. BURCH     3,160,280
DEVICE FOR MOUNTING APPARATUS
Filed Aug. 12, 1963
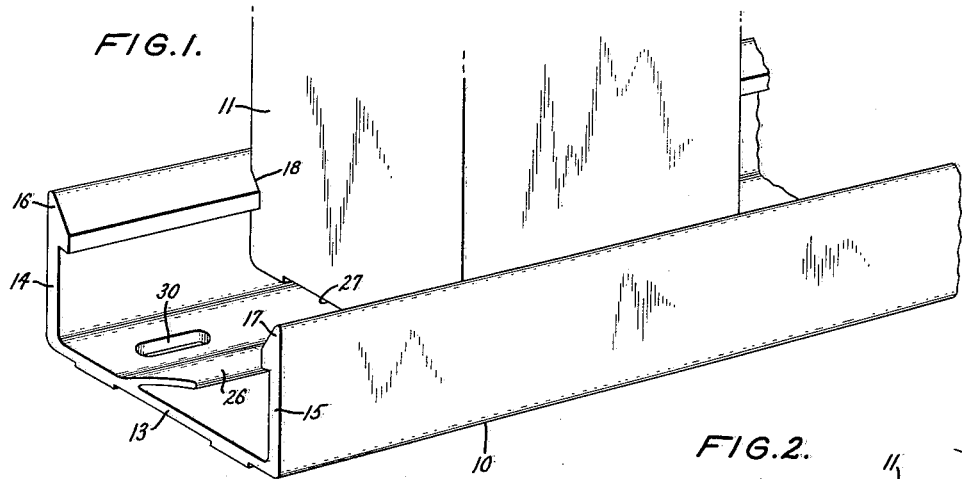
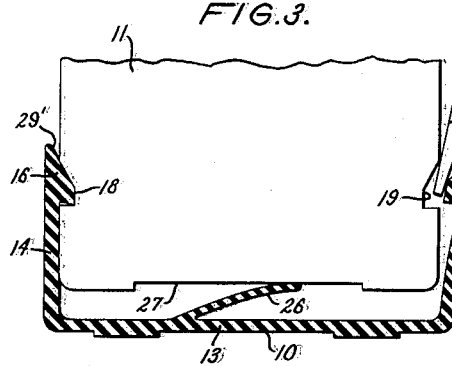
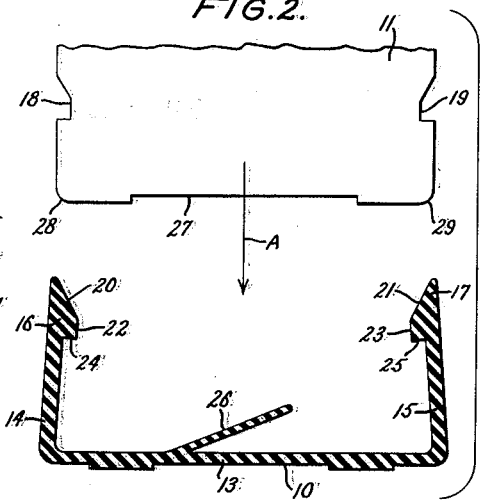
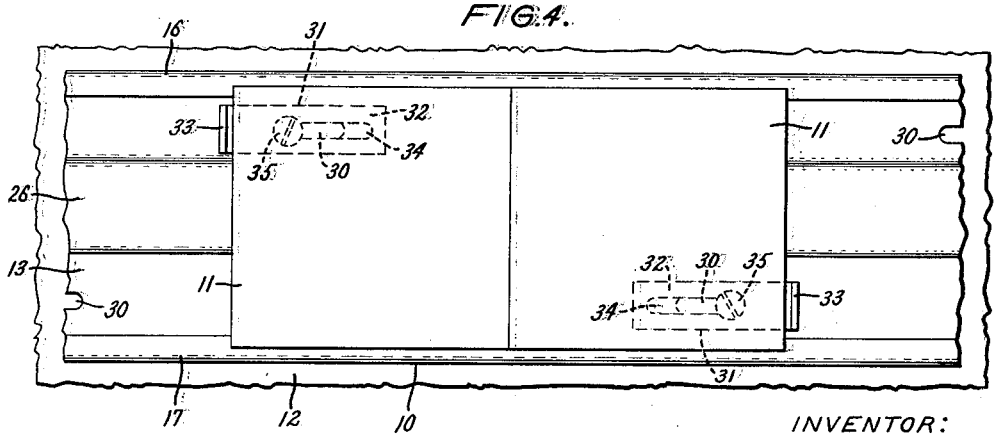
INVENTOR:
JAMES R. BURCH,
BY David M. Schiller
ATTORNEY.

United States Patent Office 3,160,280
Patented Dec. 8, 1964

3,160,280
DEVICE FOR MOUNTING APPARATUS
James R. Burch, Normal, Ill., assignor to General Electric Company, a corporation of New York
Filed Aug. 12, 1963, Ser. No. 301,364
3 Claims. (Cl. 211—89)

This invention relates to devices for mounting apparatus and has particular relation to a mounting track adapted to be secured to a panel for releasably mounting electrical apparatus such as electrical relays.

In order to mount apparatus such as electrical relays to panels it has heretofore been the practice to attach individually a number of relays directly to the panels. This prior practice has required the drilling of a large number of holes in the panel for receiving a plurality of fastening means for each relay. Such procedure involves a number of time consuming and cumbersome operations in the mounting of the relays. Further, to detach the relays from the panel, it has previously been necessary to release the fastening means of a relay which is a cumbersome and time consuming operation particularly when it is desired to detach a relay located closely adjacent other relays on the panel.

It is accordingly a primary object of the invention to provide a novel and improved mounting device for mounting apparatus without requiring special fastening means for the apparatus.

It is another object of the invention to provide a novel and improved mounting device of inexpensive construction for rigidly mounting apparatus and arranged to permit rapid installation and removal of the apparatus relative thereto.

It is a further object of the invention to provide a novel and improved mounting track of inexpensive one piece construction adapted to be secured to a panel or the like and arranged to permit snap-in mounting of electrical apparatus thereon.

It is still another object of the invention to provide a novel and improved mounting track arranged to permit snap-in mounting of a number of electrical devices therealong and to permit removal of a selected mounted device by simple manipulation of a conventional tool between the track and a mounted device.

In carrying out the invention in one form, a mounting track is provided which is adapted to be secured to a panel or the like and which is arranged to releasably mount a plurality of devices such as electrical relays. The mounting track is of one piece, channel-shaped construction and is preferably formed of a strip of extruded plastic such as polyvinyl chloride, to have a base and two transversely spaced upstanding side walls having some flexibility. The walls are formed at their edges with inwardly and downwardly inclined camming surfaces defining hooked portions adapted to be received within slots formed in the sides of electrical devices to be mounted by the track. The channel contains flexible means arranged to be engaged by the bottom of a device inserted within the channel and to be deflected toward the base when the device is fully inserted so as to exert a force on the device which firmly holds it in mounted position. As the device is inserted into the channel it engages the cam surfaces to flex and spread the channel walls which permits snap engagement of the projections with the slots of the device when the device is fully inserted. Removal of a mounted device from the channel is effected by manipulation of a suitable tool such as a screw driver, between the device and one of the channel walls to flex the wall outwardly and permit release of the device.

End stops are secured to the mounting track so as to prevent longitudinal shifting of a line of relays mounted on the track.

Other objects and advantages of the invention will become apparent from the following description taken in conjunction with the accompanying drawings in which:

FIG. 1 is a fragmentary view in perspective showing the mounting track with an electrical device mounted therein;

FIG. 2 is a view showing the mounting track in cross section with an electrical device positioned prior to insertion into the track;

FIG. 3 is a view similar to FIG. 2 showing the electrical device mounted in the track and a suitable tool disposed between the device and a side wall of the track for releasing the device; and FIG. 4 is a fragmentary view in top plan showing a pair of electrical devices mounted within the track with the track attached to a panel.

Referring now to the drawings there is illustrated in FIG. 1 a mounting track 10 constructed according to the present invention for mounting a device which may comprise for example, an electrical relay 11. The mounting track 10 comprises an elongated strip of generally channel-shaped configuration which is preferably formed of extruded plastic such as polyvinyl chloride, and which exhibits substantially rigidity. The track 10 may be formed in various lengths so as to mount various numbers of relays 11 longitudinally of the track, two mounted relays being illustrated in FIG. 4 by way of example.

As best shown in FIGS. 1–3 the track 10 includes a generally planar base 13 having upstanding therefrom a pair of transversely spaced side walls 14 and 15 extending throughout the length of the track. In accord with the present invention the side walls 14 and 15 are formed respectively with hooked portions 16 and 17 which are received within slots 18 and 19 formed in the device 11 for firmly supporting the device when such is fully inserted into the track. As best shown in FIG. 2, the hooked portions 16 and 17 are comprised of inwardly and downwardly extending cam surfaces 20 and 21 respectively which connect with generally vertical surfaces 22 and 23 which in turn connect with substantially horizontal surfaces 24 and 25. The surfaces 24 and 25 terminate at the upper ends of the generally vertical inner surfaces of the side walls 14 and 15 and form with such surfaces angles slightly less than right angles such as angles of the order of 85°. The slots 18 and 19 in the device 11 are formed with surfaces which correspond generally to the surfaces 20–25 of the hooked portions 16 and 17 previously described.

In further accord with the invention the track 10 includes flexible means which is deflected by the bottom of the device 11 when such device is fully inserted in the track and which when so deflected, exerts a force on the device tending to urge the device outwardly of the track. Such arrangement provides a very firm mounting of the device 11 within the track. In the illustrated embodiment the flexible means is in the form of a flap 26 integrally connected to the base 13 and extending throughout the length of the track. The flap 26 extends upwardly and outwardly from the base and is arranged to be engaged by the bottom surface 27 of the device 11 as such device is inserted so that when the device is fully inserted as shown in FIG. 3, the bottom surface 27 thereof deflects the flap 26 downwardly toward the base 13 and the flap exerts an upward force on the device 11. Such arrangement serves to firmly retain the hooked portions 16 and 17 within the slots 18 and 19.

In order to insert the device 11 into the track 10, the device 11 is positioned as shown in FIG. 2 with respect to the track and is moved downwardly in the direction of the arrow A. Such downward movement causes the curved lower corners 28 and 29 of the device 11 to engage the cam surfaces 20 and 21 formed on the side walls of the track which results in deflection of the side walls 14 and 15 outwardly in response to continued movement of the device 11. Further movement of the device 11 results in arrival of the slots 18 and 19 thereof opposite the hooked portions 16 and 17 at which time the hooked portions enter the slots 18 and 19 with a snap action to firmly hold the device 11 within the track. During insertion of the device, the lower surface 27 thereof deflects the flap 26 downwardly so that the flap exerts an upwardly directed force on the device 11 to assist in rigidly mounting the device within the track. Although the side walls 14 and 15 and the flap 26 have some degree of flexibility, the mounting track exhibits substantial rigidity.

In order to detach the device 11 from the track it is necessary to release the hooked portions 16 and 17 from the slots 18 and 19. This is conveniently accomplished through the agency of a suitable tool such as a screw driver T, which is inserted between the exposed portion 29' of the cam surface of one of the hooked portions and the adjacent surface of the device 11. The screw driver is then depressed slightly which operates to deflect the adjacent side wall outwardly as shown in FIG. 3, the screw driver then being employed as a pry to effect release of the device 11 from the track 10.

As best shown in FIGS. 1 and 4 the base 13 of the track is formed with a plurality of longitudinally spaced and staggered elongated slots 30 to receive suitable securing means, such as screws 35, for attaching the track 10 to the panel 12. The slots 30 are conveniently employed to mount end stops 31 which are positioned to engage the end ones of a plurality of devices 11 mounted within the track to prevent longitudinal shifting of the mounted devices relative to the track. The stops 31 are in the form of L-shaped brackets having a flat long part 32 engageable with the base 13 and an upstanding short part 33 engageable with end surfaces of the end ones of the devices 11. The L-shaped brackets are formed with elongated slots 34 adapted to overlie the slots 30 formed in the base 13 when the brackets are in operating positions. Screws 35 extend through the aligned slots 30 and 32 and into the panel 12 to secure the brackets to the track and also to secure the track to the panel. In operation, the brackets are positioned with their long parts 32 beneath the end relays and are loosely attached to the track. The elongation of the aligned slots 30 and 32 permits limited longitudinal adjustment of the brackets relative to the mounting track.

The present invention provides a very convenient and inexpensive arrangement for mounting devices to a panel. The devices may be rapidly inserted into the mounting track with a snap action and firmly retained therein through the agency of the hooked portions and the resilient flap. It is thus seen that special securing means for each mounted device heretofore necessary are eliminated by the present invention. The devices are readily released from the mounting track by manipulation of a readily available tool. By means of the invention devices located between other such devices, are readily removed without disturbing the other devices.

While I have shown and described particular embodiments of my invention, it will be obvious to those skilled in the art that various changes and modifications may be made without departing from my invention in its broader aspects and I, therefore, intend in the appended claims to cover all such changes and modifications as fall within the true spirit and scope of my invention.

What I claim as new and desire to secure by Letters Patent of the United States is:

1. A device for mounting apparatus comprising, a channel-shaped strip having a base and a pair of spaced flexible side walls projecting from the base, said side walls having inwardly facing hooked portions adapted to enter slots formed in apparatus to be inserted into the channel, said side walls having cam surfaces engageable by the apparatus in response to insertion thereof to deflect the side walls outwardly so that the hooked portions enter the slots with a snap action, and a flap integrally formed on said base and extending throughout the length of the channel, said flap including an end portion spaced from the base to be deflected toward the base by the apparatus when the apparatus is fully inserted, said flap when so deflected extering a force on the apparatus tending to urge it away from the base.

2. A device for mounting apparatus comprising, a channel-shaped strip having a base and pair of spaced flexible side walls projecting from the base, said side walls having inwardly facing hooked portions adapted to enter slots formed in apparatus to be inserted into the channel, said side walls having cam surfaces engageable by the apparatus in response to insertion thereof to deflect the side walls outwardly so that the hooked portions enter the slots with a snap action, a flap integrally formed on said base and extending throughout the length of the channel, said flap including an end portion spaced from the base to be deflected toward the base by the apparatus when the apparatus is fully inserted, said base including a plurality of elongated slots spaced longitudinally thereof on opposite sides of said flap.

3. A device for mounting apparatus comprising, an elongated one-piece, channel-shaped member exhibiting substantial rigidity and having a base with a pair of spaced flexible side walls upstanding from the base, the edges of said side walls being formed with inwardly and downwardly inclinded cam surfaces defining projections adapted to enter slots formed in apparatus to be inserted into the channel, an elongated flap upstanding from said base with a terminal part spaced from the base, said terminal part being engageable by the apparatus during insertion thereof to exert a force on the apparatus when full inserted tending to move it outwardly of the channel, said cam surfaces being engageable by the apparatus during insertion thereof to deflect the side walls outwardly so that the projections engage the slots of the apparatus with a snap action during insertion of the apparatus, said cam surfaces having portions exposed when the apparatus is fully inserted to permit insertion of a tool between the exposed cam surfaces and the apparatus for releasing the apparatus.

References Cited by the Examiner
UNITED STATES PATENTS

| 1,668,953 | 5/28 | Erickson | 248—316 |
| 2,230,898 | 2/41 | MacFadden | 248—361 |
| 2,455,141 | 11/48 | Runge | 248—316 |
| 2,681,716 | 6/54 | Black | 189—88 |
| 2,758,748 | 8/56 | Konefes | 220—73 |
| 2,832,475 | 4/58 | Linsley | 211—26 |

CLAUDE A. LE ROY, *Primary Examiner.*

FRANK L. ABBOTT, *Examiner.*